Feb. 4, 1930.   H. J. J. M. DE R. DE BELLESGIZE   1,745,359
ELECTRICAL SIGNALING
Filed Jan. 6, 1925   2 Sheets-Sheet 1

INVENTOR
H. J. J. M. De R-de BELLESCIZE
BY
ATTORNEY

Feb. 4, 1930.  H. J. J. M. DE R. DE BELLESCIZE  1,745,359
ELECTRICAL SIGNALING
Filed Jan. 6, 1925  2 Sheets-Sheet 2

INVENTOR
H.J.J. M. De R. de BELLESCIZE
BY
ATTORNEY

Patented Feb. 4, 1930

1,745,359

UNITED STATES PATENT OFFICE

HENRI JEAN JOSEPH MARIE DE REGNAULD DE BELLESCIZE, OF PARIS, FRANCE.

ELECTRICAL SIGNALING

Application filed January 6, 1925, Serial No. 748, and in France January 9, 1924.

My invention relates to electrical signaling and particularly to electrical signaling systems and methods for the transmission and reception of radio signals.

One of the principal objects of my invention is the provision of an electrical signaling system having the following advantages:—

1. Substantial increase in the strength of received signals for a given rate of transmission of signals or substantial increase in the rate of transmission of signals with a received signal strength of a predetermined value and 2. Synchronization of the transmitting and receiving stations.

Other objects and advantages of my invention will be apparent from the following description taken in conjunction with the accompanying drawings in which.

If a train of alternating voltage waves is impressed on a tuned circuit tuned to the frequency of the impressed voltage, the time required for the current to attain its maximum amplitude will be proportional to the length of time that the voltage is impressed on the circuit divided by the duration of a cycle of the alternating voltage. It is therefore obvious that the maximum amplitude of current flowing in such a tuned circuit may be quickly attained by either increasing the duration of time that the voltage is impressed on the circuit or decreasing the duration of the cycle of the impressed voltage, viz, increasing the frequency of the impressed voltage.

In the transmission of signals represented by dots and dashes, a unit of time or space is generally chosen, one of these units representing a dot, three of these units representing a dash, etc. In the Morse code, the average word is made up of eight of these units of time while in the Baudaut alphabet the average word is made up of five of these units of time. It is therefore obvious that for a given keying frequency the Baudaut alphabet is 1.6 times as efficient as the Morse code, resulting in a signal amplitude of substantially 1.6 times that of the signal amplitude when the Morse code is employed, everything else, of course, being equal.

If the carrier waves were modulated at variable frequencies, a predetermined frequency corresponding to a distinct letter of the alphabet, such a code would be eight times more efficient than the Morse code. This is true because each letter of the alphabet could be transmitted by a single train of waves in the given unit of time; whereas, if the Morse code is employed, a plurality of trains of waves with silent periods therebetween must be transmitted during the eight of the said units of time. However, such an extensive frequency modulation of the carrier waves is not feasible owing to the jamming and interference which would result due to the large number of modulating frequencies necessary for each transmitting station.

Figure 1:
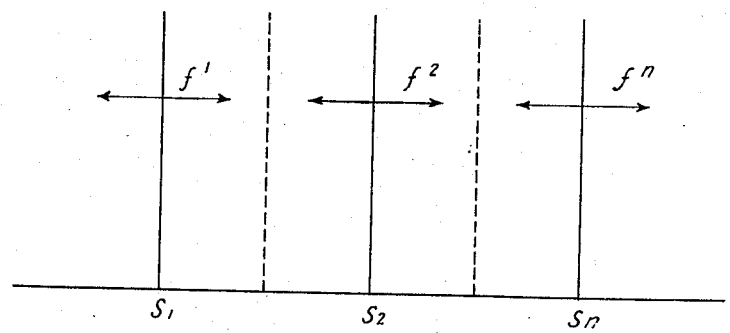
Fig. 1 is a diagrammatic view of a wave spectrum.

However, the above disadvantages are largely obviated by selecting say a limited band of frequencies for each sending station $S_1, S_2 \ldots S_n$ as shown in Fig. 1. Each of these bands may embrace a variation of 250 cycles. For instance, a sending station $S_1$ is transmitting on a mean wave length of 20,000 meters corresponding to a frequency of 15,000. This station could be allotted nine different waves, the frequencies of said waves differing from one another by fifteen. The active transmitting frequency band would therefore equal 8 x 15, or 120 cycles. This would leave an inactive or unemployed frequency band of 250 minus 120, or 130 cycles between the active transmitting frequency bands of adjacent stations. Such an inactive frequency band between transmitting stations is sufficiently high to prevent undue interference and jamming.

It is possible to obtain 72 different combinations by combining in pairs these nine waves of different frequncies in various ways.

Such a number of combinations is adequate to represent or transmit letters, figures, punctuations, etc. Such a code would be substantially four times more efficient than the Morse code. In other words, with a given signal transmitting frequency, the signal amplitude in the receiving system would be approximately four times larger than the signal amplitude if the Morse code were employed; or with a predetermined maximum amplitude of the signal strength in a receiving system, the signal transmitting frequency of this code would be approximately four times greater than that if the Morse code were employed.

Figure 3:
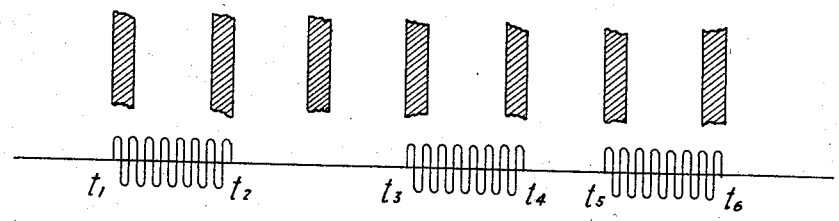
Fig. 3 is a diagrammatic illustration of trains of signal waves.
Figure 4:
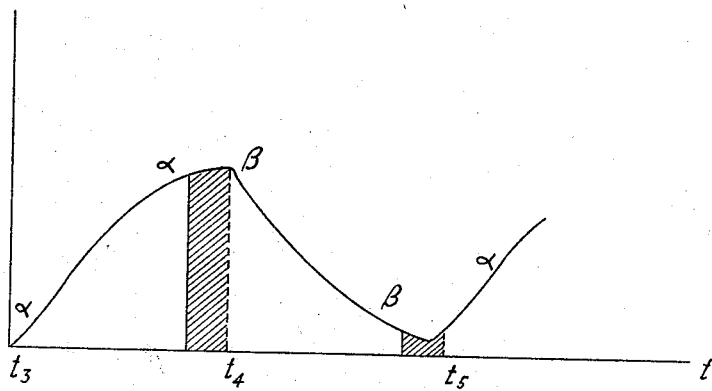
Fig. 4 is a curve showing the contour of a received signal pulse after amplification and detection, time being represented as abscissæ and amplitudes being represented as ordinates.
Figure 2:
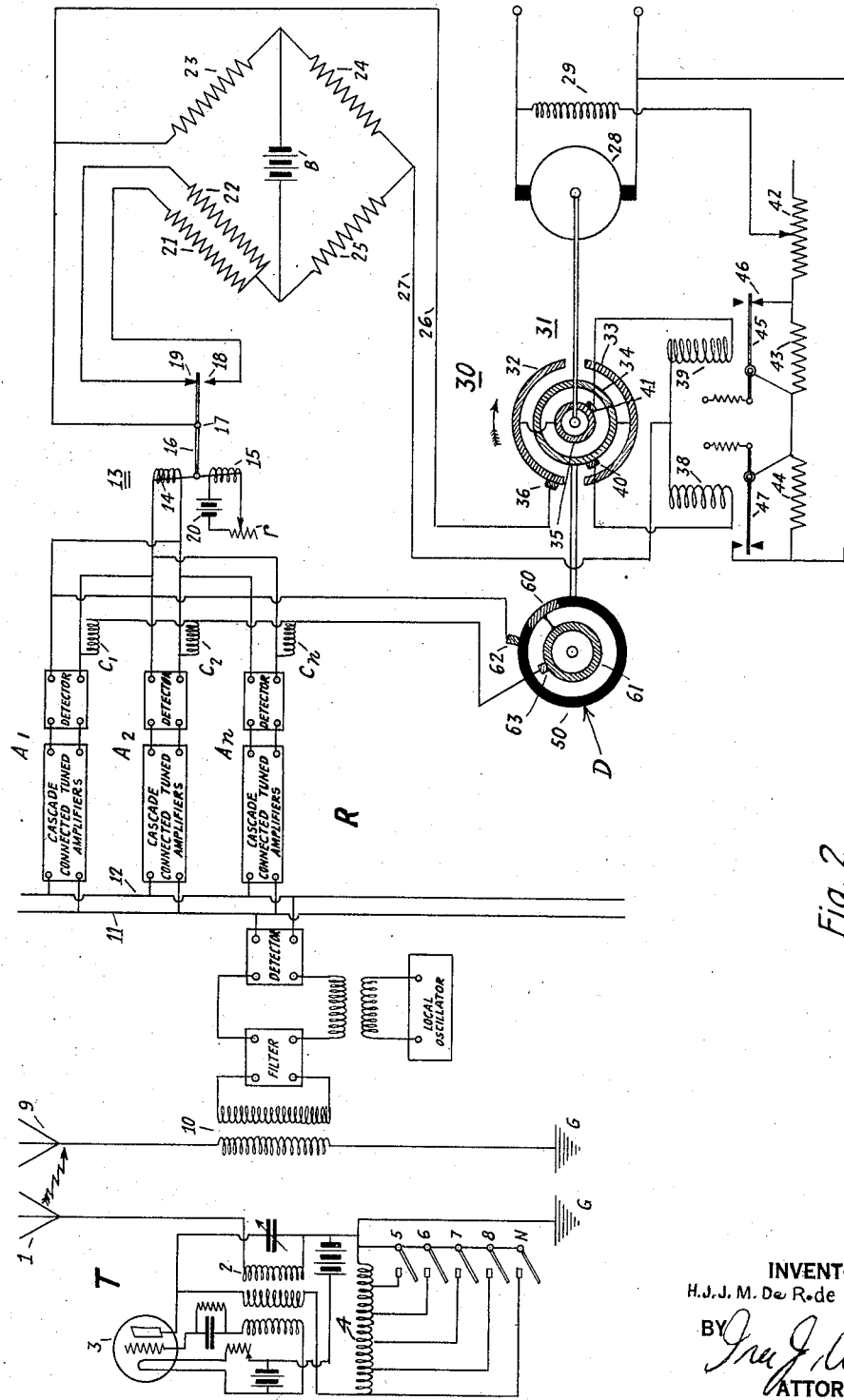
Fig. 2 is a schematic diagram of a preferred sending and receiving system.

Referring to Figs. 2, 3, and 4, my signal system comprises a transmitting system T and a receiving system R.

The transmitting system T comprises an antenna 1 and a coupling coil 2 connected in series and grounded at G as shown. The antenna circuit is energized by waves of different frequencies from the oscillation generator triode 3. The oscillation generator 3 is arranged to generate a plurality of trains of waves of different frequencies by means of a variable induction coil 4 having a plurality of taps communicating with a plurality of contacts 5, 6, 7, 8, N. The transmitting device is arranged to operate these contacts in various predetermined ways for effecting the transmission of the proper combinations of trains of different waves. It is, of course, understood that any desired number of these contacts may be furnished for effecting the transmission of any number of waves of different frequencies. The antenna circuit is sufficiently damped to effect a uniformity in amplitudes when transmitting on any of the various waves.

The receiving system R comprises a receiving antenna 9 and the primary winding of the coupling device 10 connected in series and grounded at G. The terminals of the secondary coil of the coupling device 10 are connected to the input of an electrical filter which is tuned to permit a given frequency band to pass therethrough. Adjustable tuning may be employed in connection with this filter for shifting the frequency band to any desirable position in the wave spectrum. The output terminals of the electrical filter are connected to the input terminals of a detector, a local oscillator being inductively coupled to one of the output leads of the filter for producing a desired value of beat frequency.

The output terminals of the detector are connected across leads 11 and 12. A plurality of signal receiving devices $A_1$, $A_2$ ... $A_n$ are connected across leads 11 and 12. Each of these signal receiving devices comprises a plurality of adjustably tuned amplifiers connected in cascade preferably with coupling between output and input circuits of each of said amplifiers for further regulating the time constant in such a manner as to attain the desired degree of selective tuning. A detector is connected to the output terminals of the last amplifier of the series. Relay coils $C_1$, $C_2$ ... $C_n$ of the recording mechanism are connected across the detectors of the signal receiving device $A_1$, $A_2$ ... $A_n$ respectively through a distributor D as shown, the said distributor being driven by a motor 28 and provided for a purpose to be hereinafter disclosed.

Synchronism between the keying and recording apparatus is maintained by the aid of the signals sent out by any of the contacts, 5 for example, and received by the corresponding selector device or relay $C_1$. These signals comprise trains of equal length (Figure 3), there being provided between them intervals of unequal length or duration, but multiples of that of one train. In other words, the intervals $t_1$—$t_2$, $t_2$—$t_3$, $t_3$—$t_4$, etc. between the beginnings and ends of signals comprise a hole number of times the constant quantity $t_1$—$t_2$, which is itself determined and governed by the speed of rotation of the distributor at the sending station. The distances between shaded areas in Figure 3 indicate equal intervals of time.

The distributor D comprises an insulated ring 50 having a conducting segment 60 therein and a continuous conducting ring 61. Brushes 62 and 63 are in electrical contact with rings 50 and 61 respectively. Segment 60 is electrically connected to ring 61 as shown.

A relay 13 comprises coils 14 and 15 acting in opposition on an armature 16 pivoted at 17. One extremity of this armtaure is arranged to alternately contact with stationary contacts 18 and 19. The coil 15 is connected across a source of direct current power 20 through an adjustable rheostat $r$. The coil 14 is connected across the output terminals of each detector as shown. The armature or keeper 16 of the relay 13 swings in one sense or in the other according to whether the contacts 5, 6 ... N are depressed or not. The movements of 16 are produced at the instants $t_1$, $t_2$, etc.

A Wheatstone bridge comprising resistances 21, 22, 23, 24 and 25 are connected together as shown with a source of direct current power B connected across resistances 24 and 25. The resistances 21 and 22 are equal in value and one or the other is normally connected to resistance 23 through stationary contacts 18 and 19 and armature 17. The source of power B is connected across one of the diagonals of the bridge while leads 26 and 27 are connected across the other diagonal of the bridge.

The recording mechanism is driven by the motor 28 having a field winding 29. This motor also drives at a constant rate of speed a commutating device 30 comprising a split commutating ring 31, having two sections 32 and 33 insulated from each other and two continuous conducting rings 34 and 35. Field rheostats, as explained below, make it possible to control this speed at a value as close as possible to that imparted to the sending distributor on basis of whatever has been agreed between the two corresponding stations. The sections 32 and 33 make a complete turn during the length or duration $t_1$—$t_2$ of a wave train. The section 32 is electrically connected to the continuous ring 35, while the section 33 is electrically connected to the continuous ring 34. Lead 26 is connected to a brush 36 bearing on the split commutating ring 31.

Lead 27 is connected to a terminal of each of the relay coils 38 and 39, the other terminal of relay coil 38 being connected to a brush 40 which is in electrical contact with continuous conducting ring 34 and the other terminal of coil 39 being connected to brush 41 which is in electrical contact with the continuous conducting ring 35.

The field circuit of motor 28 comprises a field winding 29, an adjustable rheostat 42 and regulating rheostats 43 and 44, all connected in series across the armature of the motor as shown. The regulating resistances 43 and 44 are substantially equal in value. When relay coil 39 is de-energized, resistance 43 is short-circuited by relay armature 45 and stationary contact 46, the armature being normally biased to this position by means of the spring mechanism. When relay coil 38 is de-energized, the resistance 44 is in circuit with the field winding, which is effected by armature 47 associated with the coil 38 and the biasing spring mechanism associated with this armature. It is therefore obvious that the de-energization of coil 39 eliminates resistance 43 from the field circuit while the energization of coil 39 effects the insertion of resistance 43 in the field circuit. It is also obvious that the de-energization of coil 38 effects the introduction of resistance 44 in the field circuit while the energization of coil 38 effects its elimination from the field circuit.

The above described system functions in the following manner:—

A plurality of trains of waves of different frequencies are radiated from the antenna 1. These waves impinge on the receiving antenna 9, pass through the filter which prevents the passage of undesired waves therethrough and are converted by the local oscillator into beats, the beats being detected by the detector. The signal receivers $A_1$ $A_2$ . . . $A_n$ receive and detect that particular train of waves to which they are tuned, the signals being recorded by means of recording mechanism comprising relay coil $C_1$ $C_2$ . . . $C_n$.

A signal passing through one of the relays, say, $C_1$, does not preserve its more or less rectangular shape as shown in Figure 3 for the wave-trains. On account of the high time-constants which the various tuned circuits must be given in order to improve the over-voltage and insure selection between extremely neighboring waves the oscillations supplied to the detector tube assume the well-known form indicated in Figure 4; the part $\alpha\alpha$ corresponds to the length of a wave train ($T_3$—$T_4$) while the part $\beta\beta$ corresponds to an interval ($T_4$—$T_5$) between two trains of waves. Such a form of received signal pulse is not promotive of efficient recording and causes what is known as sticking of the relays. The relay coils $C_1$ $C_2$ . . . $C_n$ are arranged to actuate their respective armatures when the amplitude of the signal pulse attains substantially its maximum values lying within the cross hatched area as shown. This is accomplished by means of the distributor D driven by the motor 28 which also drives the commutating device 30 mounted on the same shaft. The plate circuits of the detector tubes controlling the relays $C_1$, $C_2$, etc., are closed during a fraction only of each revolution of the distributor D, the shifting of the brush 62 being adjusted tentatively to the most favorable value. This slight modification allows of attaining the same advantage as if the power radiated by the sender were raised 2 to 5 times.

The coil 15 of relay 13 is designed and energized to exert about one-half of the pulling power on armature 16 that coil 14 exerts when energized by a received signal. Therefore when no signal is being received, armature 16 contacts with stationary contact 19 to effect the introduction of resistance 22 into the Wheatstone bridge.

On the other hand, when a signal is received, the pulling power of coil 14 exceeds that of coil 15, moving armature 16 from the stationary contact 19 to the stationary contact 18. For an instant of time this results in both resistances 21 and 22 being removed from the Wheatstone bridge. The bridge is therefore unbalanced and a pulse of current is sent through leads 26 and 27 by the source of power B. If the brush 36 rests on both of the sections 32 and 33, coils 38 and 39 are both energized. This results in the introduction of resistance 43 into the field circuit and the elimination of resistance 44 from the field circuit. As these two resistances are of equal value, the speed of the motor 28 remains the same.

However, if the recording mechanism should lag somewhat behind the transmitting mechanism at the transmitting station, the brush 36 will contact with the section 32 which will result in the energization of coil 39 and the de-energization of coil 38. The energization of coil 39 will effect the insertion of resistance 43 into the field circuit thereby decreasing the energization of the field winding 29 compelling the motor 28 to speed up. If the speed of the recording mechanism is leading that of the transmitting mechanism, the brush 36 will be in electrical contact with the section 33. This will result in the energization of coil 38 and the deenergization of coil 39. The energization of coil 38 will eliminate the resistance 44 from the field circuit of the motor thereby increasing the energization of field winding 29 to effect a decrease in the speed of the motor.

The present invention can be used however, alone or else in combination with other devices and means, for instance consisting of limiting the amplitude of the incoming oscillations before they have been supplied to the resonators and it is well known that the results obtained then are so much better, the better the conditions of resonance.

While I have shown and described a preferred modification of my invention, I do not limit myself to the same, but may employ such other modifications that may come within the spirit and scope of my invention.

I claim the following:—

1. In a printing telegraph system, in which the signal code consists of different combinations of wave impulses of equal duration and of different characteristics, the combination of a plurality of receiving circuits each of which is tuned to receive said different wave characteristics, a signal recording relay associated with each of said receiving circuits, means common to all said recording relays and connected in series therewith for causing their operation at predetermined intervals, and means common to the output circuits of all said receiving circuits and actuated thereby for controlling the relay operating means, whereby the recording relays and received signal impulses are maintained in synchronism.

2. In a printing telegraph system, in which the signal code consists of different combinations of wave impulses of equal duration and of different characteristics, the combination of a plurality of receiving circuits each of which is tuned to receive said different wave characteristics, a circuit including a signal recording relay associated with the output of each of said receiving circuits, circuit closing and opening means common to all of said relay circuits for causing simultaneous operation of said recording relays at a predetermined interval of each received signal impulse, and means associated with the output of each of said receiving circuits for controlling the relay circuit closing and opening means, whereby the recording relays and received signal impulses are maintained in synchronism.

3. In a printing telegraph system, in which the signal code consists of different combinations of wave impulses of equal duration and of different characteristics, the combination of a plurality of receiving circuits each of which is tuned to receive said different wave characteristics, a circuit including a signal recording relay associated with the output of each of said receiving circuits, a continuously rotatable member associated with a common portion of all the relay circuits for opening and closing said relay circuits at predetermined intervals, said rotatable member comprising a pair of ring elements, one of said elements being a conducting ring while the other ring element has a conducting and non-conducting portion, both conducting portions of said rings being connected together, a motor arranged to drive said rotatable member at a predetermined speed, and means associated with said receiving circuits and actuated thereby for controlling the speed of said motor, which in turn, controls through the rotatable member the operation of the signal recording relays, whereby the recording relays and received signal impulses are maintained in synchronism.

4. In a radio signaling system, the combination of a plurality of receiving circuits each of which is tuned to a different wave characteristic, a circuit including a signal recording relay associated with the output of each receiving circuit, and means associated with a common portion of all the relay circuits for simultaneously closing said relay circuits at a predetermined interval of each received signal impulse.

5. In a radio signaling system wherein the signal code consists of different combinations of wave impulses of equal duration and of different characteristics, the combination of a plurality of receiving circuits each of which is separately tuned to said different wave characteristics, a recording relay connected in the output circuit of each receiving circuit, and means common to all of said recording relays for causing said relays to operate simultaneously at the instant when each received signal impulse reaches its maximum value.

6. In a radio signaling system wherein the signal code consists of different combinations of wave impulses of equal duration and of different characteristics, the combination of a plurality of receiving circuits each of which is separately tuned to said different wave characteristics, a recording relay connected in the output circuit of each receiving circuit, and means common to all of said recording relays for causing said relays to operate simultaneously at the instant when each received signal impulse reaches its maximum value, said means comprising a continuously rotatable switching member for making and breaking the relay circuits, the speed of rotation of said member depending upon the duration of the received signal impulses.

7. In a radio signaling system wherein the signal code consists of different combinations of wave impulses of equal duration and of different characteristics, the combination of a plurality of parallelly-arranged receiving circuits each of which is separately tuned to said different wave characteristics, a recording relay connected in the output circuit of each receiving circuit, means common to all of said recording relays for causing said relays to operate simultaneously at the instant when each received impulse reaches its maximum value, said means comprising a continuously rotatable switching member for making and breaking the relay circuits, the speed of rotation of said member depending upon the duration of the received signal impulses, and auxiliary means connected in the output circuits of said receiving circuits for controlling the speed of said rotatable switching member.

HENRI JEAN JOSEPH MARIE
de REGNAULD de BELLESCIZE.